United States Patent
Rejsa

[11] 3,804,637
[45] Apr. 16, 1974

[54] DOUGH LAPPING APPARATUS
[75] Inventor: Jack J. Rejsa, Minneapolis, Minn.
[73] Assignee: The Pillsbury Company, Minneapolis, Minn.
[22] Filed: Oct. 2, 1972
[21] Appl. No.: 294,141

[52] U.S. Cl. .............................. 99/450.1, 226/113
[51] Int. Cl. ........................ A23p 1/00, B65h 17/42
[58] Field of Search .......... 99/450.1, 450.2; 198/31; 226/113, 119

[56] References Cited
UNITED STATES PATENTS
2,627,822   2/1953   Hubbard ........................... 99/450.1

Primary Examiner—Billy J. Wilhite
Assistant Examiner—Alan I. Cantor
Attorney, Agent, or Firm—James V. Harmon; Michael D. Ellwein; Ronald E. Lund

[57] ABSTRACT

A dough lapping apparatus is described which includes a dough strip guide consisting of guide rolls mounted for rotation between two parallel drive chains entrained over three laterally spaced pairs of sprockets. The center pair of sprockets is raised above the other two pairs to form an apex. A drive arrangement is provided to move the chains in unison first in one direction and then in the other thereby causing the rolls mounted between the chains to oscillate alternately to the left and right. An endless strip of dough is fed between the guide rolls. A takeaway conveyor is mounted at right angles to the in-feed conveyor beneath the raised set of sprockets to receive the dough strip which, as the guide rolls oscillate, is folded back and forth across itself to provide a lapped dough structure on the take-away conveyor. A preferred drive arrangement consists of a rack and pinion geared to one of the chain sprockets. Simple harmonic motion provided by a crank arm connected to the rack and pinion is modified by an eccentric drive to speed up the harmonic motion at the end of each stroke of the rack.

6 Claims, 4 Drawing Figures

PATENTED APR 16 1974 3,804,637

3,804,637

DOUGH LAPPING APPARATUS

FIELD OF THE INVENTION

The present invention relates to dough handling equipment and more particularly to equipment for folding dough upon itself to provide a lapped configuration.

THE PRIOR ART

A variety of devices have been previously proposed for lapping dough sheets. Normally the dough sheet is advanced continuously as an endless band to a lapping machine which, as the dough drops from the in-feed conveyor to a lower elevation, causes the dough to be lapped or folded back and forth across itself alternately to the left and right thereby providing a lapped structure for the purpose of thickening the dough strip which often gives the finished product more tender, flaky eating characteristics. A typical machine for accomplishing this purpose is described in U. S. Pat. No. 3,148,635. These machines, although their performance is excellent, are relatively large in size, expensive to manufacture and are subject to wear thereby necessitating the occasional replacement of worn parts.

Other machines for lapping dough are described in U.S. Pat. Nos.: 1,210,496, 3,216,374, 2,823,625, 2,123,703, 1,868,317, 2,687,699.

These prior devices have various shortcomings which render them unsuitable for use in connection with continuously lapping fresh dough while at the same time providing a well structured lap in which the dough is not laid down too rapidly at the center of the lapped structure.

OBJECTS OF THE DISCLOSURE

The main objects of the present invention are to provide a dough lapping apparatus having the following characteristics and advantages: a) a relatively compact structure requiring relatively few parts to minimize wear as well as being rugged in construction and economical to produce, b) has ample room beneath dough guide rolls for the insertion of the end of the take-away conveyor having a height at its end from three to eight inches, c) the provision of an ocillating lapper apparatus with means for increasing the lapping speed at the stroke ends in relation to the normal speed of a reciprocating body driven by harmonic motion by means of a connecting rod and crank assembly, d) provision for achieving a well structured lap in the finished product wherein the dough is not laid down too rapidly at the center portion of the lap, e) provision for guiding the dough strip from side to side and a further provision for supporting the adjacent part of the strip on each side of the guide, f) provision for adjusting the stroke length to provide a lapped dough structure of any width desired, g) provision for reducing the complexity of the drive arrangement and the number of belts and/or chains employed for actuating operating parts, h) provision for reducing floor space requirements and, i) the provision of an apparatus that is easy to clean.

THE FIGURES

SUMMARY OF THE INVENTION

Figure 1:
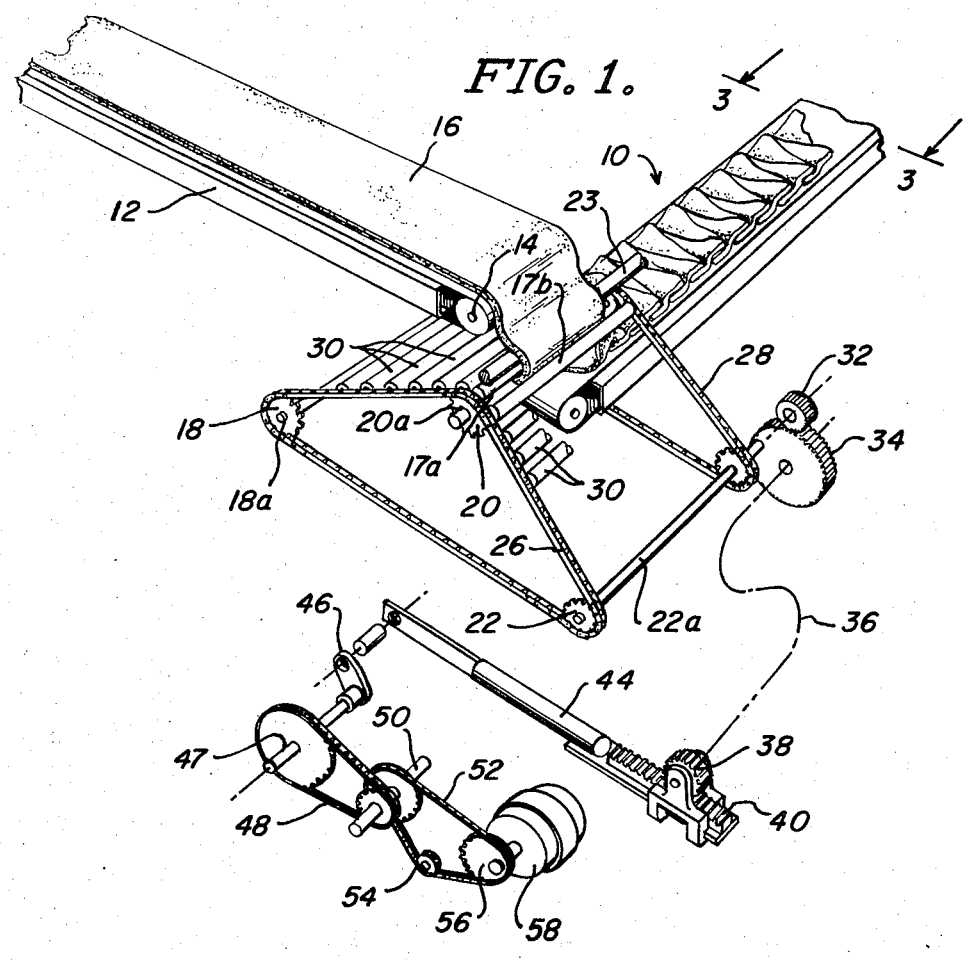
FIG. 1 is a semidiagrammatic perspective view of the invention.

A dough lapping apparatus is described which consists of a dough guide such as rolls mounted for rotation between two parallel drive chains entrained over three laterally spaced pairs of sprockets. When chains and sprockets support the guide, the center pair of sprockets is preferably raised above the other two pairs to form an apex. A drive arrangement is provided to drive the dough guide first in one direction and then in the other thereby causing the guide to ocillate alternately to the left and right. An endless strip of dough is fed into the guide. A take-away conveyor is mounted beneath the guide to receive the dough strip which is folded back and forth across itself by the guide to provide a lapped dough structure on the take-away conveyor. A preferred drive arrangement consists of a rack and pinion geared to the guide. Simple harmonic motion provided by a crank arm connected to the rack and pinion is modified by an eccentric rotating drive element (e.g., gear or sprocket) to speed up the harmonic motion at the end of each stroke of the rack and also to slow down the motion at the mid-point of each stroke of the rack.

In brief terms, the dough guide preferably consists of a pair of parallel guide rolls 17a and 17b mounted for rotation between two parallel drive chains 26 and 28 entrained over three laterally spaced pairs of sprockets in which the center pair of sprockets is raised somewhat above the other two pairs. The chains are driven first in one direction and then in the other thereby causing the guide rolls mounted between the chains to ocillate alternately to the left and right. A take-away conveyor 60 mounted beneath the raised set of sprockets receives the dough strip which is folded back and forth across itself to provide a lapped dough structure 64 on the take-away conveyor. A rack and pinion 38, 40 geared to one of the sprockets shaft 22a imparts harmonic motion to the chains. An eccentric drive sprocket 56 speeds up the motion of the crank and rack at each end of their stroke of the rack minimizing the dwell period.

As seen in FIG. 1, a feed conveyor 12 which is a standard belt conveyor that feeds a dough strip 16 from left to right, between the guide rolls 17a and 17b which impart the lateral ocillatory motion to the strip as will be described more fully below. Mounted for free rotation upon supporting brackets 19 and 21 affixed to a supporting framework 25 is a guide roll 23 which is positioned just beyond the free end of the conveyor 12, i.e., just to the right thereof as seen in FIG. 1 such that it is just slightly below the end of the conveyor 12 and parallel thereto. The guide rolls 17a and 17b are supported by chains 26 and 28 entrained over three pairs of sprockets, the first pair 18 being mounted on a shaft 18a, the second pair 20, each being mounted on a short shaft 20a, and the third pair 22 being mounted on a shaft 22a (FIG. 1).

Figure 3:
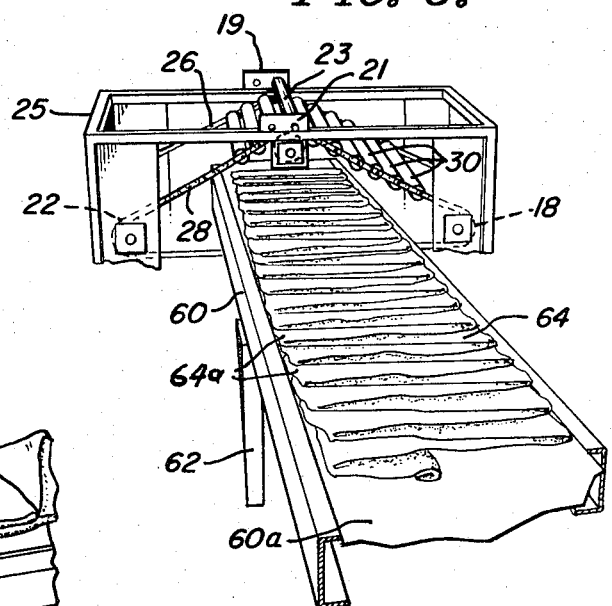
FIG. 3 is a perspective view of the apparatus taken on line 3—3 of FIG. 1.

Each of these laterally spaced and longitudinally aligned sprocket pairs 18–22 is supported upon its respective shaft for rotation upon the supporting framework 25 (FIG. 3). Each of the shafts 18a–22a is parallel to the end of conveyor 12 and is placed in horizontal position. Shafts 20a are located somewhat above the other two shafts to provide ample space for the end of the take-away conveyor 60 to be described below.

The roll 23 is preferably located on the same side of the shaft 20a from the end of the feed conveyor 12. Accordingly, when the feed conveyor is on the left as seen in FIG. 3, roll 23 is on the left side of the shaft 20a. When the in-feed conveyor 12 is on the right side, the roll 23 is moved to the right of shaft 20a. Openings can be provided in the brackets 19 and 21 to allow roll 23 to be moved as required. The width of the lapped material can be changed by changing the length of the crank arm 46. To this end, the crank arm 46 can be either of adjustable length or cranks of various lengths can be interchanged as needed.

Figure 4:
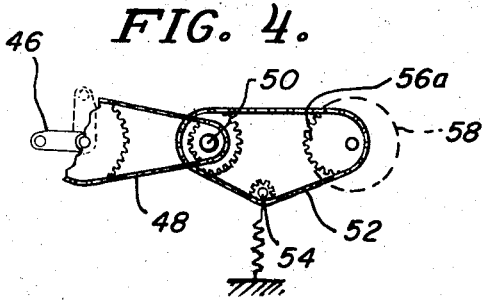
FIG. 4 is a diagram illustrating the relationship between the eccentric drive sprocket and crank arm.

Chains 26 and 28 are entrained over the respective aligned sprockets on the shafts 18a, 20a and 22a, mounted between them secured to chains 26 and 28 on either side of rolls 17a and 17b are additional idler rolls 30 which function at times to support the dough when the rolls 17a and 17b are to be right or left of their center position. Connected to the shaft 22a are a pair of drive gears 32 and 34 which are coupled as indicated at 36 to a pinion 38 that is itself geared to a rack 40 connected to crank arm 44 and crank 46 supported upon a shaft 47. The shaft 47 is in turn coupled by a 2 to 1 ratio sprocket and chain assembly 48 to shaft 50 which is connected through a 1 to 1 ratio chain and sprocket assembly 52 and a chain tension controller 54 to a eccentric drive sprocket 56 that is mounted upon the shaft of a drive motor 58. The good results have been achieved by providing a circular sprocket 56 of 4 inches in diameter with the center of rotation located at a point 1 inch from the periphery. As seen in FIG. 4, the point of greatest eccentricity 56a of the drive sprocket 56 is aligned with the crank 46 such that the crank is at the end of its stroke when the sprocket 56 advances the drive 52 at its greatest speed. Sprockets on shaft 50 are related to provide a two to one reduction to produce a speed change to occur at each end of the crank and rack stroke.

Figure 2:
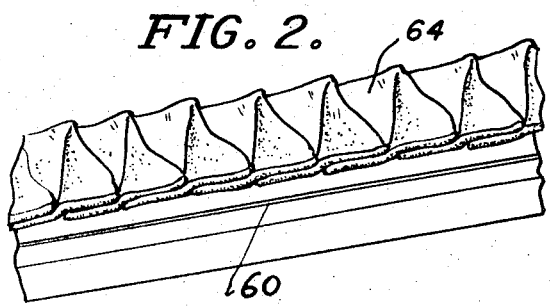
FIG. 2 is a partial perspective view of the finished lapped dough as it appears on a take-away conveyor.

In operation, as the motor 58 causes the crank 46 to rotate, the rack and pinion imparts modified harmonic motion to the guide rolls 17a and support rolls 30. As they move alternately to the left and right, the dough strip 16 is folded back and forth upon itself at 64 as seen in FIGS. 2 and 3 to provide a series of laps designated 64a. By speeding up the crank motion at each end of its stroke and slowing the crank motion at its mid stroke through the action of eccentric 56, a modified harmonic is provided which prevents movement at too fast a speed during the center portion of the stroke and at too slow a speed at each end. In this way, a well structured lap can be provided as seen in the figures.

The apparatus is reliable in operation, can be manufactured at a relatively low cost in comparision with the apparatus of the abovementioned patents, is adjustable in stroke and provides ample space to receive the take-away conveyor. Moreover, the drive arrangement has been simplified thereby reducing the amount of wear which takes place and the corresponding maintenance costs. The equipment, moreover, reduces floor space requirements and is more easily cleaned than prior equipment.

What is claimed is:

1. A dough lapping apparatus comprising a supporting framework, elongated horizontally disposed guide means for receiving a dough strip which is to be lapped upon itself mounted for lateral oscillation upon the framework in a horizontal plane perpendicular to the logitudinal axes of the guide means, a drive crank operatively associated with the guides for imparting oscillating movement thereto, an eccentric drive element operatively connected to the crank having a point of greatest eccentricity related to the position of the crank so as to increase the speed of the crank arm at the end of each stroke thereof to at least partially compensate for the diminished speed of the guide at the end of each stroke and a drive motor operatively connected to the eccentric drive element to impart rotation thereto to drive the crank and guide.

2. The apparatus of claim 1 wherein the eccentric drive element is an eccentrically mounted chain sprocket connected to the drive motor and having a drive chain entrained thereover, said chain being operatively connected to the crank whereby modified harmonic motion is imparted to the crank and guide.

3. The apparatus of claim 1 wherein the guide comprises a pair of parallel elongated elements connected between two parallel endless drive chains entrained over sprockets supported for rotation upon said framework and supporting rolls are secured parallel to the axis of the guides between the chains.

4. The apparatus of claim 3 wherein a sprocket is engaged with each of said endless chains in approximately the center thereof and is elevated above the plane of the other sprockets over which the chains are entrained to provide space for a take-away conveyor means beneath said guides.

5. A dough lapping apparatus comprising a supporting framework, horizontally disposed guide means for receiving a dough strip which is to be lapped upon itself, said guide means being mounted for lateral oscillation upon the framework in a horizontal plane parallel to the axis of the dough strip, the guide comprises a pair of parallel elements connected between two parallel related endless drive chains entrained over sprockets supported for rotation upon said framework and supporting rolls are secured between the chains adjacent to the guides and drive means connected to the guide means for imparting oscillation thereto along said axis, an eccentric drive element comprising an eccentrically mounted chain sprocket connected to the drive means, a chain entrained thereover, a crank operatively connected between the chain and the guide means whereby modified harmonic motion is imparted to the crank and guide.

6. A dough lapping apparatus comprising a supporting framework, horizontally disposed guide means for receiving a dough strip which is to be lapped upon itself said guide means being mounted for lateral oscillation upon the framework in a horizontal plane parallel to the axis of the dough strip, the guide comprises a pair of parallel elements connected between two parallel related endless drive chains entrained over sprockets supported for rotation upon said framework and supporting rolls are secured between the chains adjacent to the guides and drive means connected to the guide means for imparting oscillation thereto along said axis, other sprockets engaged with each of said endless chains in approximately the center thereof and elevated above the plane of said sprockets over which the chains are entrained to provide space for a take-away conveyor means beneath said guide means.

* * * * *